Figure 1:
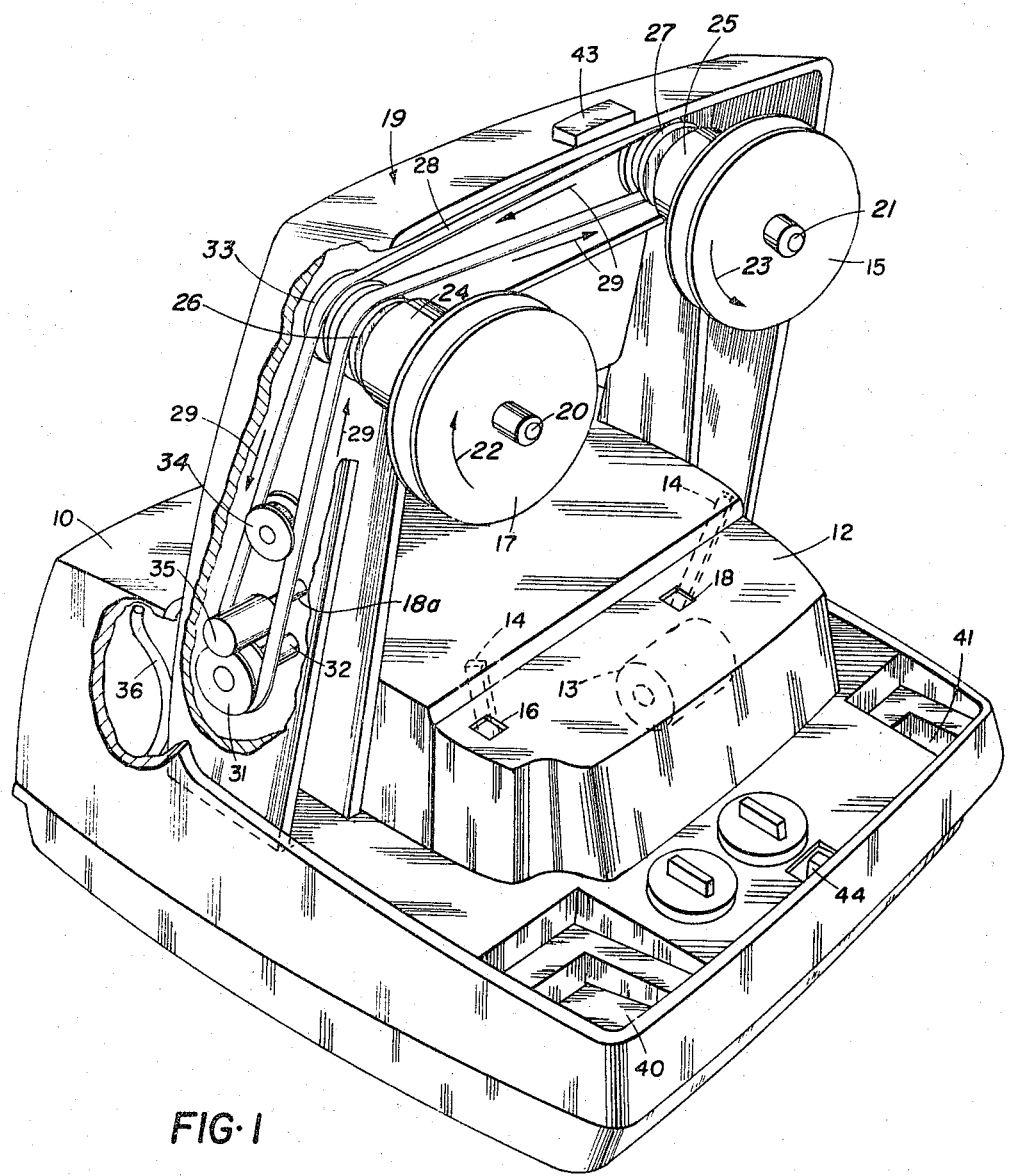

July 11, 1967   N. G. SEELEY ETAL   3,330,493
MOTION PICTURE PROJECTOR
Original Filed May 14, 1964   2 Sheets-Sheet 2

NEIL G. SEELY
BION W. MC CLELLAN
INVENTORS

BY
ATTORNEYS

United States Patent Office 3,330,493
Patented July 11, 1967

3,330,493
MOTION PICTURE PROJECTOR
Neil G. Seeley and Bion W. McClellan, Rochester, N.Y., assignors to Eastman Kodak Company, Rochester, N.Y., a corporation of New Jersey
Continuation of application Ser. No. 367,391, May 14, 1964. This application June 6, 1966, Ser. No. 555,414
16 Claims. (Cl. 242—55.11)

This application is a continuation of our application Serial No. 367,391, filed on May 14, 1964, now abandoned.

The present invention relates to motion picture projectors and more particularly, to a means for supporting and driving the film reels in a projector.

Equipment cases which functionally utilize portions of the case during operation of the equipment are known in the art. For example, film projectors have been provided with reel spindle supports on the projector housing which fold during storage of the projector to conserve storage space. However, such projectors usually require several distinct operations to prepare the projector for use. In one typical arrangement, a fixed cover is removed and set to one side, whereupon the projector reel support arms are exposed and may be snapped into an operative position. Drive cables are then attached. Each of these operations requires some knowledge of the equipment's function so that the inexperienced operator can arrange and adjust the equipment for use. Not only does improper adjustment tend to delay a film showing, but it may damage irreplaceable filmstrips. In view of the state of the prior art, there is a present need for a simple and more reliable reel support arrangement.

An object of the present invention is to provide a projector having an improved reel support and driving system which is not subject to the aforementioned limitations.

In accordance with the disclosed embodiment of our invention, a pair of reel spindles are rotatably supported on a cover of a projector housing, which is displaceable between open and closed positions relative to the housing. The spindles for supporting the reels are positioned to be located over a film gate and lens housing during film projection and to be enclosed when the cover is closed. Means are provided for operatively connecting the spindles and drive means for the projector in both the open and closed positions of the cover whereby the reel support and driving system is operative without adjustment upon movement of the cover from its closed position to its open position.

Figure 2:
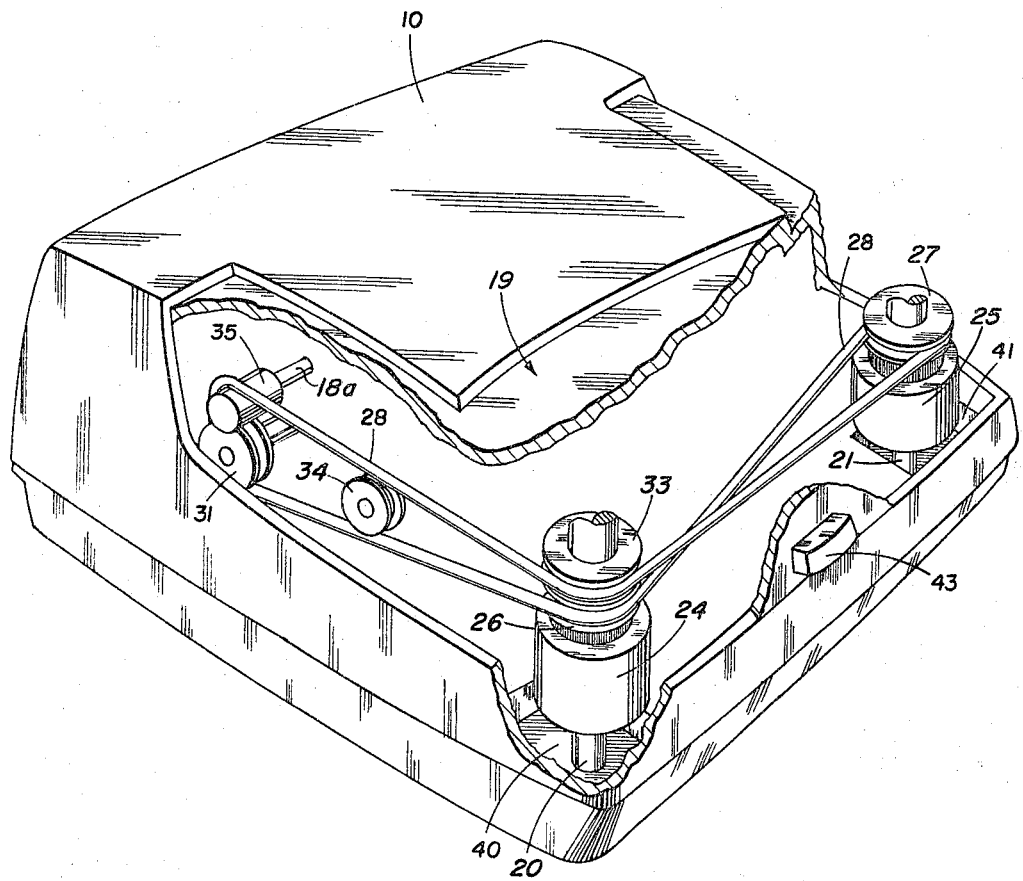

The subject matter which is regarded as our invention is particularly pointed out and distinctly claimed in the concluding portion of this specification. The invention, however, as to its organization and operation together with further objects and advantages thereof, will best be understood by reference to the following description of a preferred embodiment taken in connection with the accompanying drawings in which:

FIG. 1 is a perspective view of a motion picture projector with the cover in an open position and partially cut away to illustrate the invention; and FIG. 2 is a perspective view of the projector shown in FIG. 1 with the cover closed and partially cut away.

Referring now to the drawings wherein like numbers refer to similar parts, we have shown in FIG. 1 a main projector housing 10 which contains a drive motor, gearing, fans, pulldown mechanism (not shown) and other parts for operating the projector. Adjacent to the main housing is a lamp housing 12 containing a lens system 13 (shown in dashed lines) and a film gate (not shown) for receiving a filmstrip 14 (shown in phantom) which is supplied by a supply reel 15. After the film images are projected through the lens system 13, the filmstrip 14 passes through an aperture 16 in the housing 10 to a take-up reel 17. A similar aperture 18 receives the filmstrip 14 from the supply reel 15.

In accordance with the invention the driving and supporting means for the reels 15 and 17 are mounted on a two position cover 19 and arranged to permit opening and closing of the cover 19 without adjustment on disassembly. In the embodiment disclosed, the cover 19 is pivotally mounted on the housing 10 by means of a pair of aligned cover hinge pins 18a one of which is visible in FIG. 1. The reels 15 and 17 are mounted on support spindles 20 and 21 which are continuously driven in opposite directions as indicated by the arrows 22 and 23 respectively, by slipping clutches 24 and 25. The clutches 24 and 25 are in turn driven by pulleys 26 and 27 in accordance with the motion of a drive belt 28 as indicated by the arrow 29. This reverse torsional drive of the film 14 serves to maintain tension on the filmstrip 14 for winding the same on either reel depending on which direction the film is transported through the gate by the film pulldown mechanism (not shown) within the housing 10.

The belt 28 is driven by a drive pulley 31 mounted on a drive means comprising a drive shaft 32 coupled to the drive motor (not shown) in the main housing 10. The preferred drive means is unidirectional so that when energized it simultaneously provides torque to the spindles 19 and 20 by means of the belt 28.

An idler pulley 33 is rotatably mounted in coaxial relationship with pulley 26 on a suitable shaft extension or separate shaft to guide the belt 28 as shown. A second idler pulley 34 is rotatably mounted on the side portion of cover 19 to maintain belt alignment.

As will be apparent in FIG. 1, in the open position of the cover 19 the reels 15 and 17 and the center line of the filmstrip 14 passing through the apertures 16 and 18 all lie in a plane which is substantially perpendicular to the base plane of the housing 10 so that a projected image may be properly oriented on a screen (not shown). Because of spacing considerations, we prefer to have the drive pulley 31 substantially behind the plane defined by the reels 15 and 17 and filmstrip 14. Thus, the drive shaft 32 does not interfere with the film gate, shutter or lens system. On the other hand, the spindles 19 and 20 should be substantially perpendicular to this plane and substantially parallel to the base of the housing 10 in the open position of the cover 19 shown in FIG. 1. As a result, the drive belt 28 if allowed to move directly from the pulley 31, would approach and leave the drive pulley 26 and idler pulley 33 respectively at an angle. This angle is of no consequence in connection with the belt moving from the idler pulley 33 to the drive pulley 31. However, if allowed to approach the pulley 26 at an angle, the belt 28 would tend to jump from the groove of the pulley 26. The idler pulley 34 is provided to prevent this condition by guiding the belt 28 into straight alignment with the pulley 26.

Referring now to FIG. 2, the cover 19 is shown in its closed position and is partially cut away to illustrate the operation of means provided for maintaining the belt tension when the cover 19 is closed. In general, upon closing of the cover 19 the diameter of the drive pulley 31 is effectively increased by engagement and displacement of a portion of the belt 28 over an enlarged diameter portion or extension 35 of hinge pin 18a. Thus, although closing of the cover 19 causes the pulley 26 and idler pulley 33 to move closer relative to the drive pulley 31 due to the axis of pulley 31 being fixed relative to cover 19, this is compensated for by the increased length of the path of the belt 28 resulting from its being wrapped around the hinge pin extension 35.

When the cover 19 is closed as shown in FIG. 2 the spindle 20 is positioned in a protective spindle recess 40. A similar recess 41 is provided for protectively storing the spindle 20 when the cover 19 is closed. The cover may be latched in a closed position by a latch 43 engaging a bracket 44 (FIG. 1). As shown in FIG. 1, the spring 36 is a latch means which maintains the cover 19 latched open with sufficient force to prevent deflection thereof by the tension in filmstrip 14.

While we have shown and described particular embodiments of the present invention, other modifications may occur to those skilled in this art. We intend, therefore, to have the appended claims cover all modifications which fall within the true spirit and scope of our invention.

We claim:

1. In a motion picture projector operative with respect to a filmstrip adapted to be threaded between a pair of film reels, a reel support and drive arrangement comprising:

drive means for the projector;
   a main housing for supporting said drive means and having a base defining a first plane;
   a cover pivotally mounted on said housing and movable between open and closed positions relative thereto;
   a pair of spindles rotatably supported on said cover and each adapted to support a reel;
   a driving pulley for each of said spindles;
   a drive belt continuously coupled to said pulleys in said open and closed positions of said cover for driving the reels in directions to wind the filmstrip thereon, the reels, when supported on said spindles when said cover is in said open position being positioned in a second plane transverse to said first plane, said spindles being substantially perpendicular to said second plane when said cover is in said open position;
   pulley means coupling said drive belt to said drive means positioned in spaced relationship with said second plane; and
   guide means for guiding said belt to said driving pulleys for said spindles to prevent misalignment of said belt.

2. A reel support and drive arrangement as claimed in claim 1 further including a hinge pin for said cover positioned adjacent to said pulley means, said hinge pin having an extending portion positioned to be engaged by a portion of said belt in said closed position of said cover to insure sufficient tension of said belt to maintain said belt in coupled relationship with said pulleys in said closed position of said cover.

3. A reel support and drive arrangement as claimed in claim 1 including means for maintaining said cover in said open position with a predetermined force so that tension of the filmstrip does not affect the open position of said cover and the perpendicular relationship of said spindles to said second plane.

4. In a motion picture projector operative with respect to a filmstrip adapted to be threaded between a pair of film reels, a reel support and drive arrangement comprising:

a drive means for the projector;
   a main housing for supporting said drive means;
   a cover pivotally mounted on said housing and movable between open and closed position relative thereto;
   a pair of spindle assemblies rotatably supported on said cover, and adapted to receive and support the reels, said housing defining recesses adapted to receive said spindle assemblies when said cover is moved to said closed position;
   a drive belt for continuously coupling said drive means to said spindle assemblies in said open and closed positions of said cover to develop tension in the filmstrip in response to operation of said drive means in said open position of said cover; and
   means operative in said closed position of said cover for insuring coupling of said drive means and said spindle assemblies by said belt.

5. A reel support and drive arrangement as claimed in claim 4, wherein said drive means is operable unidirectionally and said spindle assemblies include:

a pair of slipping clutches for maintaining tension of the filmstrip when the latter is threaded between the reels and when said drive means is operative.

6. In a motion picture projector, operative with respect to a filmstrip adapted to be threaded between a pair of film reels, a support and drive arrangement for supporting the reels and filmstrip in a predetermined plane relative to the projector, comprising:

unidirectionally operative drive means for the projector;
   a main housing supporting said drive means;
   a cover pivotally mounted on said housing and movable between open and closed positions relative thereto;
   a pair of spindles rotatably supported on said cover for supporting the reels respectively in the predetermined plane in said open position of said cover, said housing defining a pair of recesses to receive said spindles respectively when said cover is closed;
   a pair of slipping clutches operatively connected to said spindles respectively;
   a drive belt continuously coupling said slipping clutches to said drive means to develop a tension in the filmstrip when said cover is in said open position and said drive means is operative;
   means for maintaining said cover in said open position; and
   means for rendering said belt effective to couple said clutch to said drive means in all positions of said cover.

7. A reel support and drive arrangement as claimed in claim 6, wherein said driving means includes a primary drive pulley positioned in spaced relationship with the predetermined plane of the filmstrip and reels, and further including a pair of reel driving pulleys for coupling said drive belt to said slipping clutches respectively;
   an idler pulley supported on said cover to guide said drive belt from one of said reel driving pulleys over an axis of the other to said reel driving pulleys to the primary drive pulley; and
   a second idler pulley positioned on said cover to guide said reel driving belt to said other drive pulley for aligning said drive belt with said other reel driving pulley.

8. In a motion picture projector operative with respect to a filmstrip adapted to be threaded between a pair of film reels, a reel support and drive arrangement for selectively supporting the reels and film in a predetermined plane comprising:

a drive means;
   a main housing for supporting said drive means;
   a cover pivotally mounted on said housing for movement between open and closed positions relative thereto;
   a pair of reel support spindles rotatably supported on said cover for supporting the reels in the predetermined plane in the open position of the cover;
a pair of driving pulleys operatively connected to said spindles respectively for driving the same;
a drive belt continuously coupled to said driving pulleys in said open and closed positions of said cover;
pulley means coupling said drive belt to said drive means; and
guide means for guiding said belt to said driving pulleys to prevent misalignment of said belt.

9. In a motion picture projector operative with respect to a filmstrip adapted to be threaded between a pair of reels, a reel support and drive arrangement comprising:
a drive means;
a main housing for supporting said drive means;
a cover for said housing;
means for pivotally supporting said cover on said housing for movement between open and closed positions relative thereto;
a pair of reel support spindles rotatably supported on said cover;
a drive belt continuously coupling said spindles to said drive means to develop a tension in the filmstrip when said cover is in said open position and said drive means is operative; and
means associated with said supporting means for said cover for maintaining the coupling of said spindles and said drive means by said belt in the closed position of said cover.

10. A reel support and drive arrangement as in claim 9 wherein said supporting means for said cover includes a hinge pin and said coupling maintaining means comprises an extension on said pin adapted to engage said belt in said closed position of said cover to prevent a decrease in tension of said belt.

11. In a motion picture projector operative with respect to a filmstrip adapted to be threaded between a pair of film reels, the combination comprising:
drive means;
a main housing for supporting said drive means;
a cover pivotally mounted on said housing and movable between open and closed positions relative thereto;
a pair of film reel supports rotatably supported on said cover for receiving and supporting the film reels;
a drive belt for operatively coupling said drive means to said reel supports; and
means for supporting said drive belt on said cover to permit displacement of said reel supports, said belt, and said cover substantially as a unit between said open and closed positions of said cover while maintaining the operative coupling of said reel supports and said drive means by said belt.

12. In a motion picture projector, the combination comprising:
a main projector housing;
drive means supported on said housing and including a rotatable drive pulley;
a cover pivotally mounted on said housing and movable between open and closed positions relative thereto;
a pair of reel spindles rotatably supported on said cover;
a rotatable driving pulley associated with each of said reel spindles;
a drive belt coupling said drive and driving pulleys for applying a rotational driving force to said spindles in response to rotation of said drive pulley; and
means for supporting said drive belt on said cover to permit displacement of said spindles, said driving pulleys, said belt and said cover substantially as a unit during movement of said cover between said open and closed positions thereof.

13. In a motion picture projector having a film illuminating and advancing mechanism operative with respect to a filmstrip threaded between a pair of film reels in a predetermined plane, the combination comprising:
drive means;
a main projector housing for supporting said drive means and the film illuminating and advancing mechanism;
a cover pivotally mounted on said housing and movable between open and closed positions relative thereto;
a pair of spindles rotatably supported on said cover for supporting the film strip reels and film in the predetermined plane in said open position of said cover;
a drive belt coupled to said spindles and said drive means to develop a tension in the film strip in response to operation of said drive means; and
means for supporting said drive belt on said cover to permit displacement of said spindles, said belt, and said cover substantially as a unit during movement of said cover between said open and closed positions thereof.

14. In a motion picture projector having a film illuminating and advancing mechanism operative with respect to a filmstrip adapted to be threaded between a pair of film reels in a predetermined plane, the combination comprising:
drive means including a rotatable drive pulley;
a main projector housing for supporting said drive means and the film illuminating and advancing mechanism;
a cover pivotally mounted on said housing and movable between open and closed positions relative thereto;
a pair of spindles rotatably supported on said cover for supporting the film reels and film in the predetermined plane in said open position of said cover;
a driving pulley for each of said spindles;
a drive belt coupled to said drive pulley of said drive means and to said driving pulleys for said spindles for driving said driving pulleys to maintain a predetermined tension in the filmstrip in response to rotation of said drive pulley; and
means for maintaining coupling of said belt with said drive pulley and said driving pulleys during movement of said cover between said open and closed positions thereof.

15. In a motion picture projector operative with respect to a filmstrip adapted to be threaded between a pair of film reels:
drive means;
a main projector housing for supporting said drive means;
a cover pivotally mounted on said housing and movable between open and closed positions relative thereto;
a pair of spindles rotatably supported on said cover in spaced relationship for supporting the film reels and film in said open position of said cover during operation of the projector; and
a drive belt for continuously coupling said drive means and said spindles in said open and closed positions of said cover.

16. In a motion picture projector operative with respect to a filmstrip adapted to be threaded between a pair of film reels, a reel support and driving system comprising:
electrically operative drive means including a rotatable member;
a main projector housing for supporting said drive means;
a cover pivotally mounted on said housing and movable between open and closed positions relative thereto;
a pair of spindles rotatably supported on said cover in spaced relationship for supporting the film reels and film in said open position of the cover during operation of the projector; and
means for continuously operatively connecting said rotatable member and said spindles in said open and closed positions of said cover whereby the reel support and driving system can be used without adjustment when said cover is moved from said closed position to said open position.

References Cited
UNITED STATES PATENTS

| | | | |
|---|---|---|---|
| 1,548,960 | 8/1925 | Stuber et al. | 242—55.14 |
| 2,358,692 | 9/1944 | De Vry | 242—55.11 |
| 2,556,563 | 6/1951 | Townsend | 242—55.12 |
| 2,676,212 | 4/1954 | Williams | 242—55.12 X |

FRANK J. COHEN, *Primary Examiner.*

GEORGE F. MAUTZ, *Examiner.*

UNITED STATES PATENT OFFICE
CERTIFICATE OF CORRECTION

Patent No. 3,330,493 July 11, 1967

Neil G. Seeley et al.

It is hereby certified that error appears in the above numbered patent requiring correction and that the said Letters Patent should read as corrected below.

Column 4, line 59, for "to", first occurrence, read -- of --; line 62, for "reel driving" read -- drive --; same line 62, for "other drive" read -- other reel driving --; column 6, line 11, for "film strip reels and film in the" read -- film reels and film strip in the --.

Signed and sealed this 29th day of October 1968.

(SEAL)
Attest:

Edward M. Fletcher, Jr.
Attesting Officer

EDWARD J. BRENNER
Commissioner of Patents